No. 644,374. Patented Feb. 27, 1900.
E. A. SOWERWINE.
HARROW.
(Application filed Dec. 20, 1898.)
(No Model.)
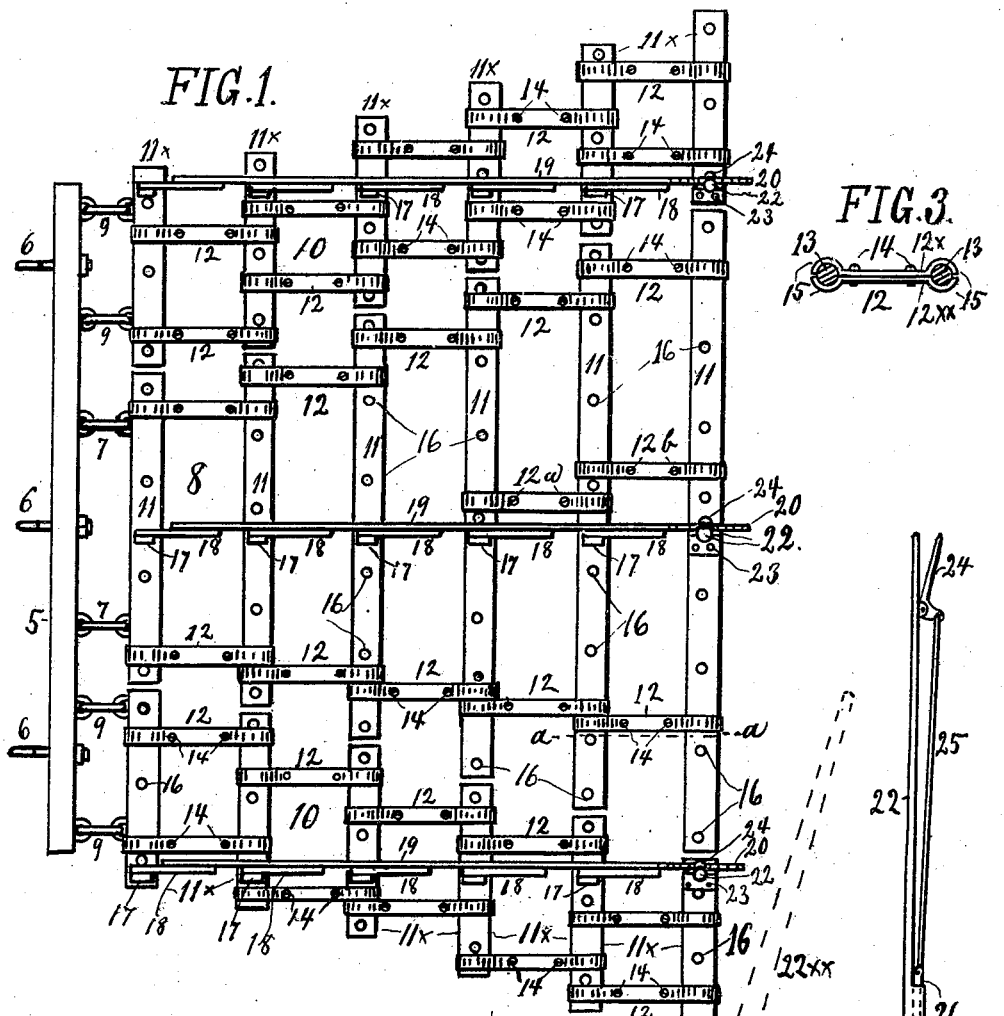
WITNESSES.
D. E. Carlsen
E. C. Carlsen
INVENTOR.
Eliakim A. Sowerwine
BY his ATTORNEY.
A. M. Carlsen.
THE NORRIS PETERS CO., PHOTO-LITHO., WASHINGTON, D. C.

UNITED STATES PATENT OFFICE.

ELIAKIM A. SOWERWINE, OF RANDOLPH, NEBRASKA.

HARROW.

SPECIFICATION forming part of Letters Patent No. 644,374, dated February 27, 1900.

Application filed December 20, 1898. Serial No. 699,855. (No model.)

*To all whom it may concern:*

Be it known that I, ELIAKIM A. SOWERWINE, a citizen of the United States, residing at Randolph, in the county of Cedar and State of Nebraska, have invented certain new and useful Improvements in Harrows; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in harrows; and the objects of my invention are, first, to provide a harrow in which the teeth may easily be tilted to various inclines back or forward of their plumb position; second, to provide a harrow composed of easily-separable sections, of which one or more may be used at a time; third, to provide an improved harrow which shall be flexible, so as to adapt itself to any unevenness of ground, and, fourth, to so construct such harrow that it may be manufactured cheaply. These and other objects I attain by the novel construction and arrangement of parts illustrated in the accompanying drawings, in which—

Figure 1 is a plan view of my complete harrow. Fig. 2 is a side view of Fig. 1. Fig. 3 is a longitudinal sectional view on the line $a\,a$ in Fig. 1. Fig. 4 is a rear view of a portion of one of the transverse or cross bars of the frame with the regulating-lever secured upon it.

Referring to the various parts in the drawings by reference-numerals, 5 designates the singletree, by which the harrow is drawn and in the front side of which are secured several hooks 6, to which any desired number of horses may be hitched, while to the rear edge or side of it is connected by the links 7 the main and central section 8 of the harrow, and nearer the ends are detachably connected by the open-sided links 9 9 the side sections 10 of the harrow, which is thus made up of three sections. The large or central section consists of a series of parallel cross-bars 11, which are of increased length toward the rear of the harrow and are connected together by the longitudinal straps or bars 12, in the ends of which their rounded necks 13 (best shown in Figs. 3 and 4) are journaled. These bars 12 I make in a cheap and substantial manner by forming them from flat bar-iron into the shape in Fig. 3, where it will be seen that the upper and lower members $12^X$ and $12^{XX}$ are secured together by the bolts or screws 14 after the necks 13 of the bars 11 are placed between the curved ends 15 of the said members. Said bars 12 may also be made of wood or malleable iron. The cross-bars 11, which are thus journaled to rock or rotate and which may be made of wood or other suitable material, are provided at their under sides with the harrow-teeth 16 and at their upper sides with the rocker-arms 17, which are pivotally connected by the links 18 to the horizontal rocker-bar 19, the rear end of which is formed into or provided with a notched segment 20, the base of which is pivoted at 21 to the upright regulating-lever 24, secured by the bolts 23 upon the rearmost one of the cross-bars 11, and provided with the common style of finger lever or latch 24, having the rod 25, raising and lowering the sliding bolt or dog 26 above and into the notches 27 of the segment 20.

From the above description it will be seen that when the lever 22 is thrown forwardly, as in the dotted lines $22^X$, the harrow-teeth will all stand in the inclined position indicated at $16^X$, and if the lever be thrown rearwardly, as at $22^{XX}$, then all the harrow-teeth will stand as at $16^{XX}$ and in such or similarly-inclined position will have a tendency to keep at any desired depth in the soil according to their incline, while if in the position $16^X$ the harrow will not only be easier to draw but the teeth will then also, if striking rocks or roots of trees, force that part of the harrow upward, slip over the obstruction uninjured, and resume operation in the soil. The position $16^X$ of the teeth is therefore especially desirable in harrowing upon a new-broken field or any field having obstructions in it.

The description thus given of the central section of the harrow suits also either of the side sections 10, with the only difference that in the side sections all the cross-bars $11^X$ are of substantially-equal length and are not only with their outer ends, but bodily, disposed more and more away from the longitudinal center line of the harrow as they approach the rear edge or end of it.

Besides the operations and advantages already described, it may be further stated that where the power of horses or other draft-animals is limited or where the sod is very tough one or both of the side sections may be detached and put one side and the middle section will work on the same principle, having the same shape as the three sections together.

The rearmost bars 11 of the middle section may have a few extra longitudinal bars or braces 12$^a$ and 12$^b$ to prevent them from bending in the middle when they are very long.

Having thus described my invention, what I claim, and desire to secure by Letters Patent, is—

In a harrow, the combination with a long singletree, of a harrow made in three sections, which are secured side by side independently of each other to the singletree; the middle one of the sections being larger than the side sections and the latter being detachable from the singletree; each of said sections being constructed of rocking cross frame-bars provided with harrow-teeth, and longitudinal frame-bars, in the ends of which the cross-bars are journaled, and a regulating hand-lever operatively connected with the rocking bars, so that the teeth of each section may be tilted backward and forward; the middle section of such harrow having cross frame-bars of increased length toward the rear of the harrow, and the side sections having cross-bars of substantially-equal length, and the adjacent edges of the sections lying substantially parallel to each other, substantially as and for the purpose set forth.

In testimony whereof I affix my signature in presence of two witnesses.

ELIAKIM A. SOWERWINE.

Witnesses:
F. M. BOWLIN,
J. B. REANER.